(12) United States Patent
Ko et al.

(10) Patent No.: US 7,287,463 B2
(45) Date of Patent: Oct. 30, 2007

(54) CYLINDRICAL BROIL APPARATUS

(76) Inventors: Shan-Wen Ko, No. 6, Alley 15, Lane 67, Minzu Rd., Hsinchu City 300 (TW); Ching-Tien Wang, 18F-2, No. 177-2, Nanhe Rd., Taichung City 402 (TW); Hui-Chun Yu, 6F, No. 41, Rongsing St., Tanzih Township, Taichung County 427 (TW)

( * ) Notice: Subject to any disclaimer, the term of this patent is extended or adjusted under 35 U.S.C. 154(b) by 0 days.

(21) Appl. No.: 10/964,759

(22) Filed: Oct. 15, 2004

(65) Prior Publication Data
US 2005/0092190 A1 May 5, 2005

(30) Foreign Application Priority Data
Oct. 15, 2003 (TW) .............. 92218335 U
Oct. 15, 2003 (TW) .............. 92218336 U

(51) Int. Cl.
*A47J 37/00* (2006.01)
(52) U.S. Cl. ............. 99/339; 99/340; 99/385; 99/401; 99/450
(58) Field of Classification Search ........... 99/339, 99/340, 400, 401, 444–450, 481, 482, 483, 99/357, 385–402, 372; 126/29, 30, 25 R, 126/9 R, 9 A
See application file for complete search history.

(56) References Cited

U.S. PATENT DOCUMENTS

| | | | | |
|---|---|---|---|---|
| 2,842,043 A | * | 7/1958 | Rebland | 99/482 |
| 3,261,344 A | * | 7/1966 | Petrie | 126/30 |
| 3,323,508 A | * | 6/1967 | Holman | 126/25 R |
| 3,814,076 A | * | 6/1974 | Zankowsky et al. | 126/25 A |
| 4,020,322 A | * | 4/1977 | Muse | 219/392 |
| 4,467,709 A | * | 8/1984 | Anstedt | 99/482 |
| 4,502,374 A | * | 3/1985 | Davis | 99/349 |
| 4,724,753 A | * | 2/1988 | Neyman et al. | 99/339 |
| 5,287,844 A | * | 2/1994 | Fieber | 126/30 |
| 5,473,979 A | * | 12/1995 | Ruben | 99/446 |
| 5,666,940 A | * | 9/1997 | Kreiter | 126/30 |
| 5,836,295 A | * | 11/1998 | Faraj | 126/25 R |
| 5,988,045 A | * | 11/1999 | Housley | 99/339 |

* cited by examiner

Primary Examiner—Timothy F. Simone
(74) Attorney, Agent, or Firm—Troxell Law Office, PLLC

(57) ABSTRACT

A circular cylindrical broil apparatus includes an outer cylinder and a core part. The outer cylinder has an upper opening at the top thereof and is provided with a lower recess at an outer wall thereof and the lower recess is inserted with a movable heat initiating plate. The core part has the bottom thereof being provided with a lower net and extends upward a plurality of circular heating cages from the lower net to form a central broil zone. Each of the heating cages has an open top and providing a core wall next to the central broil zone with a plurality of perforations. Once the heating cages are filled with fuel and placed in the outer cylinder and the initiating plate inserted into the lower recess is ignited for the fuel being burned or the heating cages are placed with a plurality of electrical heating plates and the electrical heating plates are powered on, broiled stuff, which is placed in the broil zone, can be broiled effectively.

17 Claims, 6 Drawing Sheets

CYLINDRICAL BROIL APPARATUS

FIELD OF THE INVENTION

The present invention relates to an improved cylindrical broil apparatus and particularly to a broil apparatus, which has an outer cylinder to be placed inside thereof a circular heating carrier and a broiled stuff carriage with a heat initiating plate at the bottom thereof, to treat the broiled stuff in the broiled stuff carrier effectively.

BACKGROUND OF THE INVENTION

It is frequent that food is cooked with broiling because of good smell being produced and original flavor of food being kept well. Thus, broiling becomes a cooking way used to be adopted. Food such as sausage, potato, corn and etc. is broiled often in our daily lives.

The conventional broiling with fuel such as charcoal is usually done in such a way that the charcoal is put on a flat area and ignited to burn continuously and the broiled stuff is placed over the charcoal. In order to keep the charcoal burning, additional charcoal has to be added. But, in case of the added charcoal being not burned, the unburned charcoal becomes a hinder between the broiled stuff and the flames. Meanwhile, liquid from the broiled stuff often drips to extinguish the burning charcoal if the broiled stuff is not moved and turned over again and again. Hence, it takes a lot of time, fuel and smokes to broil food and it is very often to occur side effects resulting from phenomenon such as being seriously burned and undone at sides of the food.

SUMMARY OF THE INVENTION

The present invention is to provide a circular cylindrical broil apparatus which includes an outer cylinder and a core part. The outer cylinder has an upper opening at the top thereof and is provided with a lower recess at an outer wall thereof and the lower recess is inserted with a movable heat initiating plate. The core part has the bottom thereof being provided with a lower net and extends upward a plurality of circular heating cages from the lower net to form a central broil zone. Each of the heating cages has an open top and providing a core wall next to the central broil zone with a plurality of perforations. Once the heating cages are filled with fuel and placed in the outer cylinder and the initiating plate inserted into the lower recess is ignited for the fuel being burned or the heating cages are placed with a plurality of electrical heating plates and the electrical heating plates are powered on, broiled stuff, which is placed in the broil zone, can be broiled effectively.

BRIEF DESCRIPTION OF THE DRAWINGS

The present invention can be more fully understood by reference to the following description and accompanying drawings, in which.

DETAILED DESCRIPTION OF THE INVENTION

Figure 1:
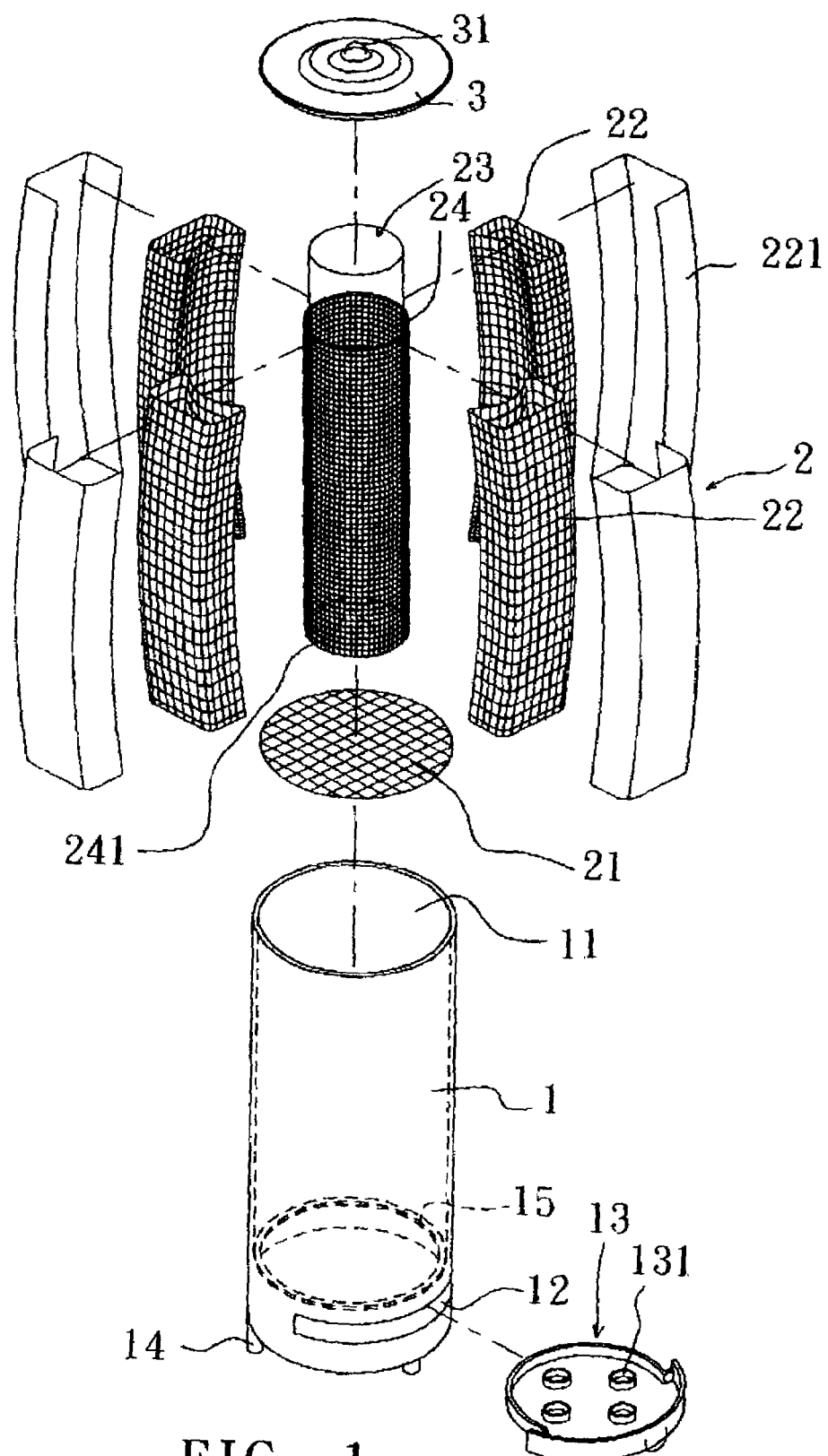
FIG. 1 is all exploded perspective view of the first embodiment of a cylindrical broil apparatus according to the present invention.
Figure 2:
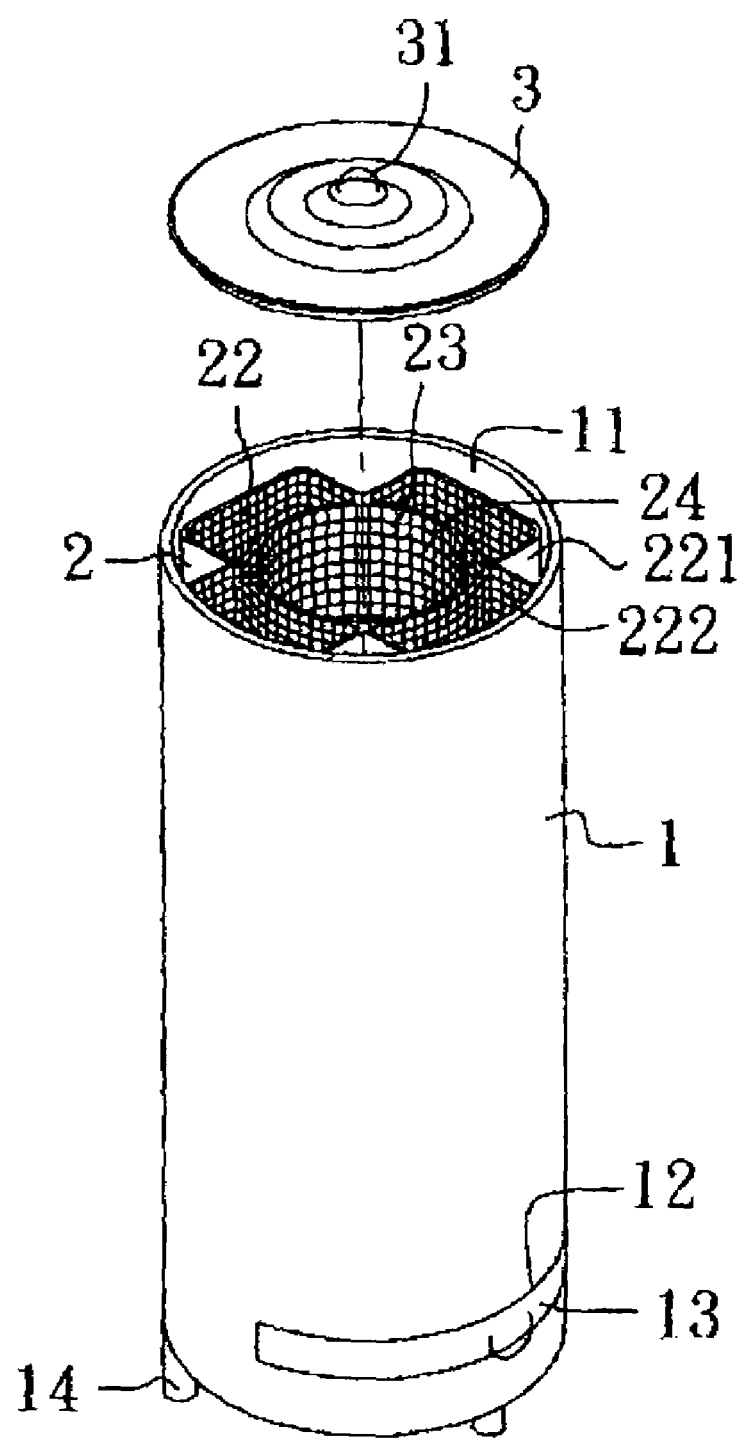
FIG. 2 is an assembled perspective view of the cylindrical broil apparatus shown in FIG. 1.
Figure 3:
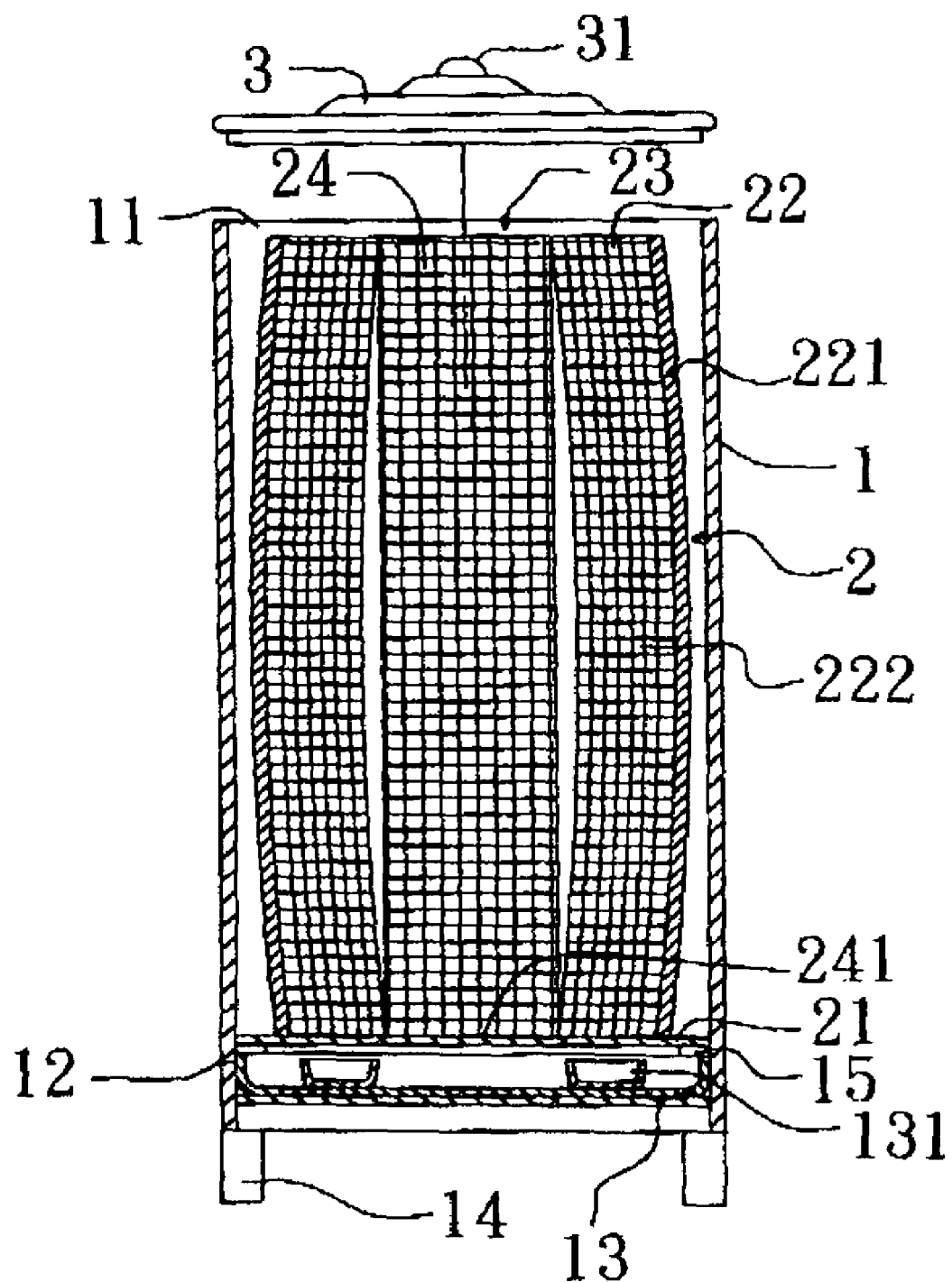
FIG. 3 is an assembled sectional view of the cylindrical broil apparatus shown in FIG. 1.

Referring to FIGS. 1 to 3, the first embodiment of a cylindrical broil apparatus according to the present invention comprises an outer cylinder 1, a core part 2 and/or an upper lid 3.

Wherein, the outer cylinder 1 has an outer opening 11 at the upper end thereof for being inserted with the core part 2. The outer cylinder 1 has a lower recess 12 at the outer wall thereof and a heat initiating plate 13 is movably inserted in the lower recess 12. The heat initiating plate 13 has a size and shape corresponding to inner part of the outer cylinder 1 with at least a heat initiating cup 131 attached to it for an igniter such as alcohol, tinder or starter. Besides, the outer cylinder 1 can be provided with a plurality of legs 14 at the bottom thereof. In order to hold the core part 2, a plurality of elongated projections 15 extend upward from the inner base thereof.

The core part 2 has a bottom net 21 aid a plurality of circular heating cages 22 extend upward from the bottom net 21. Each of the circular heating cages is surrounded with a circular wall 221 and the inner side thereof is a grid wall 222 with an open top. A broil zone 23 is formed by way of between the grid walls 222. A cylindrical core 24 can be added in the broil zone 23. The cylindrical core 24 is formed with grids and provides an open top. The lower end of the cylindrical core 24 can be an open bottom to closed with the bottom net 21 or can be closed with a bottom plate 241. The cylindrical core 24 is available for receiving broiled stuff. The cylindrical core 24, the outer cylinder 1, the circular heating cages 22 and the bottom net 21 are preferably made of heat durable metal with good conductivity such as stainless steel.

The upper lid 3 has a size corresponding to the outer opening 11 for covering the outer cylinder 11. A handle 31 can be added to the upper lid 3 for the upper lid 3 being movably covered to the outer opening 11.

Referring to FIGS. 1 to 3 again, while in use, place charcoal in the circular heating cages 22 and then the core part 2 is inserted into the outer cylinder 1. Next, igniter such as alcohol or tinder is placed in the heat initiating cups 131. Once the igniter is ignited, the charcoal on top of the heat initiating plate 13 start burning and the broiled stuff can be placed in the cylindrical core 24 for being broiled. Due to the cylindrical core 24 being surrounded with the circular heating cages 22, the flames generated from the fuel can gather at the broil zone 23 homogeneously. In this way, the broiled stuff can be done more rapidly and it is capable of consuming less fuel and less labor time. Further, the broiled stuff can be done evenly because of uniform circular flames (the high heat zone being farther from the broiled stuff) so that it is not necessary to move the broiled stuff for sharing the broiling heat. Taking the corn, which is one of the most difficultly treated broiled stuff, us an example test, it can be done evenly in 2 to 3 minutes under a condition or being not moved with the broil apparatus of the present invention. The corn is not burnt at the middle and not done at both ends thereof. Even if the corn is coated with broil paste, the whole corn can be broiled homogeneously in 20 seconds. This is an advantage not possible to be reached with the conventional broil apparatus.

Electrical heating plates can be used in the heating cages 22 instead of the charcoal to perform the broil job.

It is appreciated that the first embodiment of the cylindrical broil apparatus according to the present invention can avoid disadvantages such as wasting labor time and consumption of fuel and occurring the phenomenon of generating large amount of smokes, which results from conventional flat broil with the charcoal. Further, it is not necessary to move the broiled stuff with a better quality while the cylindrical broil apparatus is used. These are features impossibly provided with the conventional flat charcoal broil device.

Figure 4:
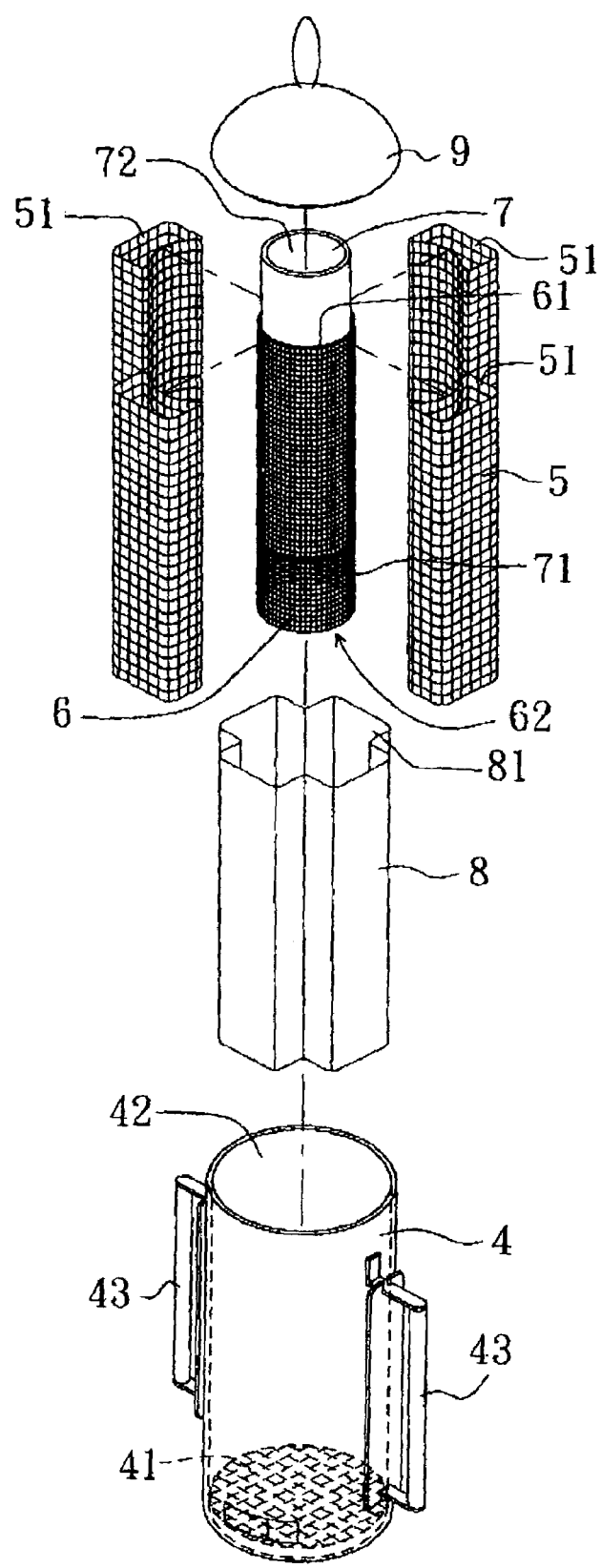
FIG. 4 is an exploded perspective view of the second embodiment of a cylindrical broil apparatus according to the present invention.
Figure 5:
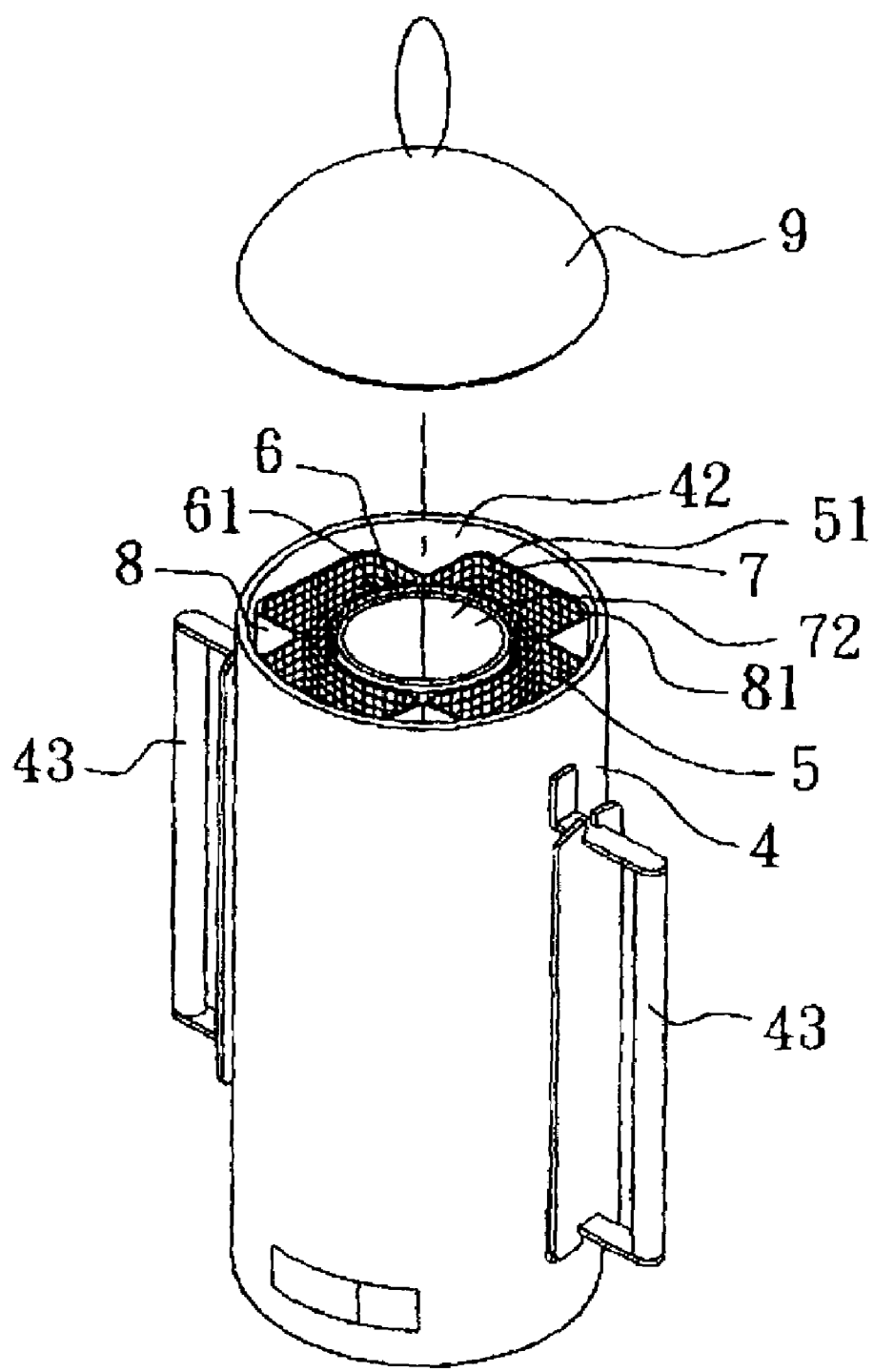
FIG. 5 is an assembled perspective view of the cylindrical broil apparatus shown in FIG. 4.
Figure 6:
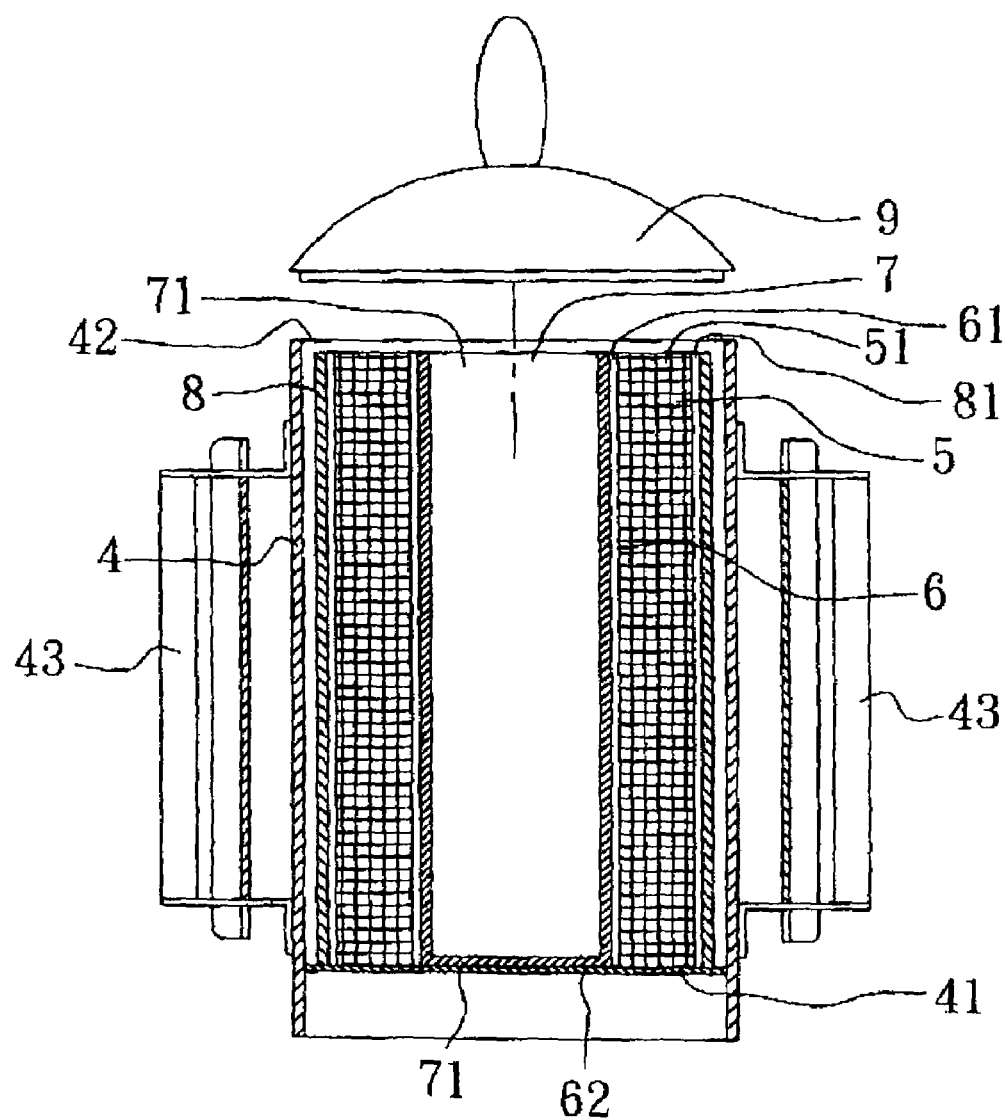
FIG. 6 is an assembled sectional view of the cylindrical broil apparatus shown in FIG. 4.

Furthermore, referring to FIGS. 4 to 6, the second embodiment of the cylindrical broil apparatus according to the present invention is illustrated. The cylindrical broil apparatus comprises an outer cylinder 4, at least two heating cages 5, a broil core 7, a partition 8 and/or an upper lid 9.

Wherein, the outer cylinder 4 has a perforated bottom 41 and the perforated bottom 41 can be provided with a grid or pure holes for igniting the fuel. The periphery of the perforated bottom 41 can be closed or provided with holes for ventilation. An upper opening 42 is provided at the upper end thereof. Besides, two opposite handles 43 made of heat insulation material are fixedly attached to the outer side of the outer cylinder 4. Except being provided with a circular cross section, the outer cylindrical 4 can be provided with a cross section of square or polygon.

Each of the heating cages 5 is preferably made of net material with an upper cage opening 51 for being available for filing fuel such as charcoal and perforated lateral sides and lower end thereof. It is preferable that the net material for the heating cages 5 is heat durable such as stainless steel net material. Two or more heating cages 5 can be used to be set up and form a central broil zone and it is preferable that the outer wall of each heating cage 5 corresponding to the outer cylinder 4 and the inner wall thereof is circular so that a circular broil zone can be formed once the hating cages 5 are built tip. In this way, each heating cage 5 can be withdrawn completely and soaked in the water to extinguish the flames.

The broil core 6 has a size and shape corresponding to the broil zone and it is cylindrical in the present embodiment. The broil core 6 has a closed bottom 61 and an upper opening 62 for being placed with broil stuff. The broil core 6 can be made of wall of the broil core 6 can be partly closed to control the admitted flames based on heat durable net material for the heat source passing through. Alternatively, the the broiled stuff need.

Referring to FIGS. 4 to 6 again, while in use, the fuel such as charcoal is filled in the heating cages 5 and then the heating cages 5 are placed in the outer cylinder 4. The broil core 6 is inserted into the broil zone confined with the inner walls of the heating cages 5. Once the broil apparatus is built up, the fuel at the perforated bottom 41 can be ignited with gas fuel, tinder or alcohol and the broiled stuff can be placed in the broil core 6 for being broiled with the flames from the burning fuel in the hating gages 5. In this way, the broiled stuff can be heated evenly by the surrounded flames and done quickly. Afterwards, the heating cages 5 can be pulled out rapidly and emerged in the water for extinguishing the flames. According to the experimental test of broiling a corn, it takes only 2 to 3 minutes for the corn being done evenly. Hence, the broil apparatus of the present invention can gather the flames to allow the broiled stuff being done evenly in addition to reducing the treating time and saving the fuel.

Further, all the burned charcoal can be withdrawn in 20 seconds and immersed in the water to extinguish the flames completely.

In order to isolate the broiled stuff from the fuel for purposed of health, a semi-closed cylindrical core can be added in case of the broil core 6 being grid shape. The cylindrical core 7 is heat durable with good conductivity and the bottom thereof has a closed bottom plate 71. The top thereof has a core opening 72 for the broiled stuff being placed in the cylindrical core 7.

Besides, in order to locate the heating cages 5, a hollow partition 8 can be added. The outer size of the partition 8 is a little smaller than the internal space of the outer cylinder 4 and the partition 8 provides a plurality of partition chambers 81 with the number and shape thereof corresponding to the heating cages 5. Thus, the heating cages 5 can be inserted into the partition chambers 81 and held with the partition 8.

In case of smoldering, the upper lid 9 can be used to cover the upper opening 42 of the outer cylinder 4 such that the broiled stuff can be done more quickly to avoid being too dried.

Moreover, the electrical heating plates can be arranged in the heating cages 5 instead of the charcoal to perform the broil job.

While the invention has been described with reference to the preferred embodiments thereof, it is to be understood that modifications or variations may be easily made without departing from the spirit or this invention, which is defined by the appended claims.

What is claimed is:

1. A circular cylindrical broil apparatus comprising:
   an outer cylinder having an upper opening at the top thereof, a lower recess at an outer wall thereof, and a heat initiating plate removably inserted into the lower recess;
   a core part having a lower net and a plurality of circular heating cages extending upwardly from the lower net to form a centrat broil zone, each of the plurality of heating cages having an open top and providing a core wall next to the central broil zone with a plurality of perforations.

2. The broil apparatus according to claim 1, wherein a plurality of projections are provided inside the lower part of the outer cylinder to support the core part.

3. The broil apparatus according to claim 1, wherein the central broil zone includes at least one cylindrical core.

4. The broil apparatus according to claim 1, further comprising an upper lid covering the upper opening of the outer cylinder for smoldering.

5. The broil apparatus according to claim 1, wherein the heat initiating plate includes cups attached thereto, each of the plurality of heat initiating cups are located at a bottom of each of the heating cages.

6. The broil apparatus as defined in claim 1, wherein the heating cages at the peripheries thereof are provided with perforations.

7. The broil apparatus as defined in claim 1, wherein the outer cylinder includes a plurality of legs at the bottom thereof.

8. A straight cylindrical broil apparatus comprising:
   an outer cylinder having a perforated bottom and an open top;
   at least two heating cages placed in the outer cylinder forming a central broil zone, each of the at least two cages having an open end and perforations through a peripheral surface and a bottom thereof; and a broil core having a core bottom and an open upper end, the broil core having a size corresponding to the central broil zone.

9. The broil apparatus according to claim 8, wherein the perforated bottom of the outer cylinder has a grid shape.

10. The broil apparatus according to claim 8, wherein the peripheral surface of each of the at least two heating cages has a grid shape.

11. The broil apparatus according to claim 8, wherein each of the at least two heating cages has a curved inner side.

12. The broil apparatus according to claim 8, wherein the outer cylinder has at least one heat insulation handle.

13. The broil apparatus according to claim 8, further comprising an upper lid covering the open top of the outer cylinder for smoldering.

14. The broil apparatus according to claim 8, further comprising a partition placed in the outer cylinder and having a plurality of partition chambers corresponding in size and shape to the at lest two heating cages.

15. The broil apparatus according to claim 8, wherein the broil core having a peripheral surface having a grid shape.

16. The broil apparatus according to claim 15, further comprising a core cylinder being semi-closed with an open upper end and removably inserted into the broil core.

17. The broil apparatus according to claim 8, wherein the core bottom is one of a grid shape plate without perforations.

* * * * *